United States Patent
Bonnaffé et al.

(10) Patent No.: US 11,889,189 B1
(45) Date of Patent: Jan. 30, 2024

(54) STABILIZATION OF VIDEO WITH OBJECT DETECTION

(71) Applicant: GoPro, Inc., San Mateo, CA (US)

(72) Inventors: Séraphin Cyrille Philippe Bonnaffé, San Mateo, CA (US); Nicolas Rahmouni, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 26 days.

(21) Appl. No.: 17/739,742

(22) Filed: May 9, 2022

(51) Int. Cl.
*H04N 23/68* (2023.01)
*G02B 27/64* (2006.01)
*H04N 5/14* (2006.01)

(52) U.S. Cl.
CPC ......... *H04N 23/683* (2023.01); *G02B 27/646* (2013.01); *H04N 5/144* (2013.01); *H04N 23/6811* (2023.01)

(58) Field of Classification Search
CPC .. H04N 23/683; H04N 23/6811; H04N 5/144; G02B 27/646
See application file for complete search history.

(56) References Cited

U.S. PATENT DOCUMENTS 11,064,118 B1 * 7/2021 Rahmouni ......... H04N 23/6812

* cited by examiner

*Primary Examiner* — Twyler L Haskins
*Assistant Examiner* — Fayez A Bhuiyan
(74) *Attorney, Agent, or Firm* — ESPLIN & ASSOCIATES, PC

(57) ABSTRACT

An image capture device may capture a video. A part of the video may include depiction of an object of interest, and another part of the video may not include depiction of the object of interest. Stabilization of the video may switch between object stabilization and movement stabilization based on whether or not the video depicts the object of interest. The part of the video depicting the object of interest may be stabilized using object stabilization. The part of the video not depicting the object of interest may be stabilized using movement stabilization.

20 Claims, 6 Drawing Sheets

STABILIZATION OF VIDEO WITH OBJECT DETECTION

FIELD

This disclosure relates to different stabilization of a video based on whether or not an object of interest is depicted within the video.

BACKGROUND

A video captured by a moving image capture device may be stabilized to provide a more stable version of the video. When an object of interest, such as a person's face, is captured within the video, a user may wish to view a version of the video that follows the object of interest.

SUMMARY

This disclosure relates to stabilizing videos. Visual information and/or other information may be obtained. The visual information may define visual content. The visual content may be captured by an image capture device. Whether an object of interest is depicted within the visual content may be determined. Responsive to determination that the visual content does not depict the object of interest, the visual content may be stabilized based on movement of the image capture device during capture of the visual content and/or information. Responsive to determination that the visual content depicts the object of interest, the visual content may be stabilized based on placement of the object of interest within the visual content and/or other information.

A system for stabilizing videos may include one or more electronic storage, processor, and/or other components. The electronic storage may store visual information, information relating to visual content, information relating to capture of the visual content, information relating to an image capture device, information relating to an object of interest, information relating to stabilization of the visual content, and/or other information.

The processor(s) may be configured by machine-readable instructions. Executing the machine-readable instructions may cause the processor(s) to facilitate stabilizing videos. The machine-readable instructions may include one or more computer program components. The computer program components may include one or more of a visual information component, an object of interest component, a movement stabilization component, an object stabilization component, and/or other computer program components.

The visual information component may be configured to obtain visual information and/or other information. The visual information may define visual content. The visual content may be captured by an image capture device.

The object of interest component may be configured to determine whether an object of interest is depicted within the visual content. Whether the object of interest is depicted within the visual content may be determined based on analysis of the visual content and/or other information. In some implementations, the object of interest may include a face.

The movement stabilization component may be configured to, responsive to determination that the visual content does not depict the object of interest, stabilize the visual content based on movement of the image capture device during capture of the visual content and/or other information.

In some implementations, stabilization of the visual content based on the movement of the image capture device during capture of the visual content may include use of a first viewing window to provide a first punchout of the visual content.

The object stabilization component may be configured to, responsive to determination that the visual content depicts the object of interest, stabilize the visual content based on placement of the object of interest within the visual content and/or other information. In some implementations, the visual content may be stabilized based on the placement of the object of interest to keep the object of interest within a center portion and/or other portion of the stabilized visual content.

In some implementations, stabilization of the visual content based on the placement of the object of interest within the visual content may include use of a second viewing window to provide a second punchout of the visual content. The second viewing window may be smaller than the first viewing window.

In some implementations, stabilization of the visual content based on the placement of the object of interest within the visual content may include determination of rotation of a viewing window based on rotation of the object of interest within the visual content and/or other information.

In some implementations, the determination of the rotation of the viewing window based on the rotation of the object of interest within the visual content may be performed responsive to stabilization of the visual content based on the movement of the image capture device during capture of the visual content including horizon leveling.

In some implementations, the determination of the rotation of the viewing window based on the rotation of the object of interest within the visual content may be performed by replacing use of gravity vector of the image capture device in the horizon leveling with use of the rotation of the object of interest within the visual content.

In some implementations, stabilization of the visual content based on the placement of the face within the visual content may change based on facial expression and/or other information.

In some implementations, stabilization of the visual content may be performed during capture of the visual content by the image capture device.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
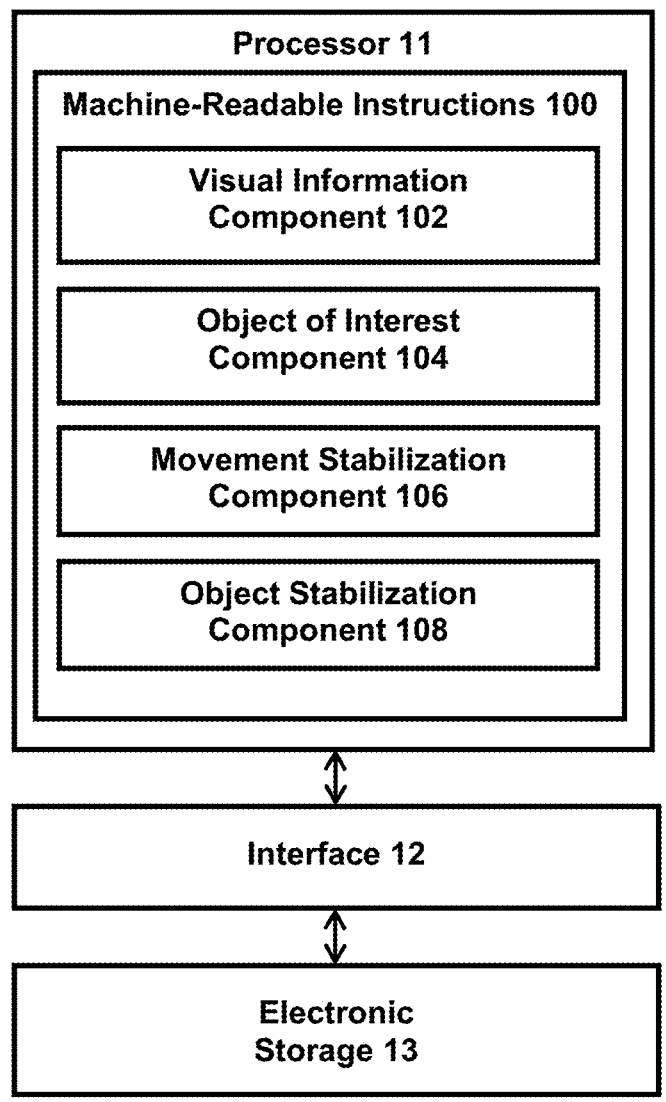
FIG. 1 illustrates a system for stabilizing videos.

FIG. 1 illustrates a system 10 for stabilizing videos. The system 10 may include one or more of a processor 11, an interface 12 (e.g., bus, wireless interface), an electronic storage 13, and/or other components. The system 10 may include and/or be part of an image capture device. Visual information and/or other information may be obtained by the processor 11. The visual information may define visual content. The visual content may be captured by an image capture device. Whether an object of interest is depicted within the visual content may be determined by the processor 11. Responsive to determination that the visual content depicts the object of interest, the visual content may be stabilized by the processor 11 based on placement of the object of interest within the visual content and/or other information. Responsive to determination that the visual content does not depict the object of interest, the visual content may be stabilized by the processor 11 based on movement of the image capture device during capture of the visual content and/or information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, information relating to capture of the visual content, information relating to an image capture device, information relating to an object of interest, information relating to stabilization of the visual content, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate stabilizing videos. The machine-readable instructions 100 may include one or more computer program components. The machine-readable instructions 100 may include one or more of a visual information component 102, an object of interest component 104, a movement stabilization component 106, an object stabilization component 108, and/or other computer program components.

The visual information component 102 may be configured to obtain visual information and/or other information. Obtaining visual information may include one or more of accessing, acquiring, analyzing, capturing, determining, examining, generating, identifying, loading, locating, opening, receiving, retrieving, reviewing, selecting, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations. The visual information component 102 may obtain visual information from one or more hardware components (e.g., an image sensor) and/or one or more software components (e.g., software running on a computing device).

In some implementations, the visual information component 102 may obtain visual information during capture of the visual content. The visual information may be obtained as an image capture device/image sensor is capturing the visual content. The visual information may be obtained during capture of the visual content to perform during-capture stabilization of the visual content. In some implementations, the visual information component 102 may obtain visual information after capture of the visual content. The visual information may be obtained after an image capture device/image sensor has captured the visual content and the visual content has been stored in memory. The visual information may be obtained after capture of the visual content to perform post-capture stabilization of the visual content.

In some implementations, the visual information component 102 may obtain visual information based on user interaction with a user interface/application (e.g., video editing application, video player application), and/or other information. For example, a user interface/application may provide option(s) for a user to stabilize a video/depiction of objects within a video. The visual information defining the visual content of a video may be obtained based on the user's selection of the video through the user interface/video application. Other selections of visual content for retrieval of visual information are contemplated.

The visual information may define visual content. The visual content may be captured by an image capture device. The visual information may define visual content by including information that defines one or more content, qualities, attributes, features, and/or other aspects of the visual content. For example, the visual information may define visual content by including information that makes up the visual content and/or information that is used to determine the visual content. For instance, the visual information may include information that makes up and/or is used to determine the arrangement of pixels, characteristics of pixels, values of pixels, and/or other aspects of pixels that define visual content of a video. Other types of visual information are contemplated.

The visual content may have a field of view. The field of view of the visual content may refer to a portion of a scene that was observed by the image capture device in capturing the visual content. The field of view may refer to the extent (e.g., angle, size) of the scene that is captured within the visual content.

The visual content may include depiction of one or more objects. The visual content may include depiction of a living object and/or a non-living object. The visual content may include depiction of the entirety of an object or one or more parts of the object. For example, the visual content may include depiction of a face (e.g., a person's face). For instance, the visual content of the video may be captured by an image capture device that includes the face within the field of view of the image capture device. FIG. 3 illustrates an example face 302 depicted within visual content 300 of an image/video.

The depiction of an object within the visual content may move during the progress length of the visual content/video. For example, the object and/or the image capture device capturing the visual content may move during capture of the visual content. Such movement may cause the depiction of the object to change placement within the field of view of the visual content. Placement of the object depicted within the visual content may refer to state of how the object is depicted within the visual content. Placement of the object depicted within the visual content may refer to location and/or arrangement of the depiction of the object within the visual content. Placement of the object depicted within the visual content may include one or more of rotation, position, and/or size of the object depicted within the visual content. For example, a person's head may move during capture of visual content of a video, which may cause the placement, such as rotation (e.g., roll, yaw, pitch), position, and/or size, of the face depicted within the visual content of the video to change.

The object of interest component 104 may be configured to determine whether an object of interest is depicted within the visual content. Determining whether an object of interest is depicted within the visual content may include ascertaining, detecting, establishing, finding, identifying, obtaining, and/or otherwise determining whether the object of interest is depicted within the visual content. Determining whether an object of interest is depicted within the visual content may include determining whether a depiction of the object is located within the field of view of the visual content. Determining whether an object of interest is depicted within the visual content may include determining whether the entirety of the object is depicted within the visual content. Determining whether an object of interest is depicted within the visual content may include determining whether one or more parts of the object are depicted within the visual content.

An object of interest may refer to an object that a user may be interested in (e.g., for viewing, for editing, for sharing). In some implementations, an object of interest may be set by the user. For example, a user may select a particular object as the object of interest. In some implementations, an object of interest may be set based on one or more defaults. For example, a particular object may be predefined to be an object of interest. An object of interest may include a living object (e.g., a person, a part of a person, such as a face) or a non-living object (e.g., vehicle, sign). An object of interest may include the entirety of a thing or one or more parts of the thing. Other types of objects of interest are contemplated.

Whether the object of interest is depicted within the visual content may be determined based on user selection, analysis of the visual content, and/or other information. User selection of whether the object of interest is depicted within the visual content may refer to user input that identifies/indicates whether the object of interest is depicted within the visual content. For example, a user may interact with a user interface to input whether an image or moment within a video includes depiction of the object of interest. Analysis of visual content may include analysis of the content of image(s)/video(s), such as analysis of the arrangement of pixels, characteristics of pixels, values of pixels, and/or other aspects of pixels of the visual content. Analysis of visual content may include use of computer vision and/or other object detection/recognition techniques to determine whether the object of interest is depicted within the visual content. Analysis of visual content may provide one or more probability on the depiction of the object of interest within the visual content. For example, analysis of visual content may include use of object detection/recognition techniques to output probabilities that the visual content depicts the object of interest (e.g., probability that a face is depicted within an image/a moment within a video) and/or probabilities relating to the depiction of interest within the visual content (e.g., probabilities that the face is smiling, that eyes are closed, that a particular emotion, such as neutral, happy, sad, surprised, disgusted, scared, upset, is expressed on the face).

The object of interest component 104 may be configured to determine placement of the object of interest within the visual content. For example, the object of interest component 104 may be configured to determine placement of a face within the visual content. Placement determination of other objects of interest within the visual content is contemplated. Determining placement of an object of interest within the visual content may include ascertaining, detecting, establishing, finding, identifying, obtaining, and/or otherwise determining the placement of the object of interest within the visual content. Determining placement of an object of interest within the visual content may include determining one or more of rotation, position, and/or size of the object of interest within the visual content.

For example, for a face depicted within the visual content, the object of interest component 104 may be configured to determine where within the visual content the face is depicted and how the face is rotated about a roll axis of the face (e.g., 0 degrees for an upright face; 180 degrees for an upside-down face, 90 degrees for a face rotated to the right, −90 degrees for a face rotated to the left). Rotation of the face about other axes (e.g., yaw axis, pitch axis) may be determined.

Figure 3A:
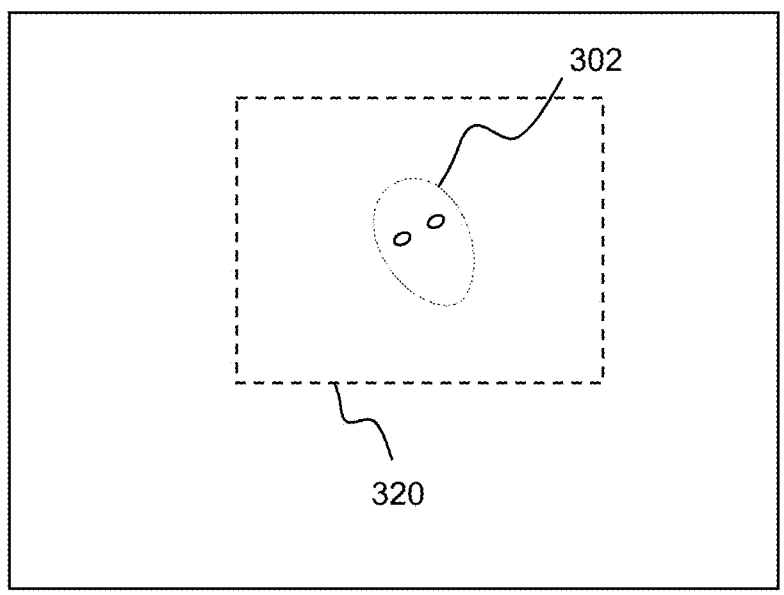
FIG. 3A illustrates an example viewing window to perform object stabilization.

For instance, FIG. 3A illustrates an example image 300. The image 300 may include a depiction of a face 302. Placement determination of the face 302 may include determination of where the face 302 is positioned within the image 300 (e.g., x-y location of the center of the face 302/box that encloses the face), how big the face 302 is within the image 300 (e.g., size of box that encloses the face), and/or how much the face is rotated (e.g., rotation of box that encloses the face).

For a video, the placement of an object of interest within the visual content may be determined as the function of progress through the progress length of the video (e.g., placement of the object of interest determined in different video frames/moments of the video). Determining placement of an object of interest within the visual content may include determining changes in the placement of the object of interest as the function of progress through the progress length of the video (e.g., determining change in placement in different video frames/moments of the video).

The placement of an object of interest within the visual content may be determined based on user selection, analysis of the visual content, and/or other information. User selection of the placement may refer to user input that identifies/designates the particular placement of the object of interest within the visual content. For example, a user may interact with a user interface to identify one or more of rotation, position, and/or size of a face within the visual content. Analysis of visual content may include analysis of the content of image(s)/video(s), such as analysis of the arrangement of pixels, characteristics of pixels, values of pixels, and/or other aspects of pixels of the visual content. Analysis of visual content may include use of computer vision and/or other object detection/recognition techniques to determine the placement of an object of interest within the visual content. For example, analysis of the content of the video frames may be used to determine one or more of rotation, position, and/or size of a face within the visual content.

In some implementations, the placement of an object of interest within the visual content may be determined based on one or more stable features of the object of interest. A stable feature of an object of interest may refer to an element/part and/or a combination of elements/parts of the object of interest that does not change over time. A stable feature of an object of interest may refer to an element/part and/or a combination of elements/parts of the object of interest that does not change as the object of interest moves.

For example, a person's face may include elements/parts that are moved by the muscles of the face. For instance, the shape of a person's mouth may change (e.g., while talking, yelling, yawning), and the shape of a person's eyes/eyebrows may change (e.g., while smiling, blinking). Usage of such unstable features to determine the placement of a face may result in inaccurate placement determination.

Instead, a person's face may include elements/parts that are not moved/not moved very much (e.g., movement of the element/part is less than a threshold movement amount) by the muscles of the face. For example, upper cheek points/areas of a person's face may not move/be moved very much (e.g., change position, change shape) when the person is using the muscles of the face (e.g., while talking, yelling, yawning, smiling, blinking). As another example, a person's nose and ears may not move/be moved very much when the person is using the muscles of the face.

Usage of such stable features to determine the placement of a face may result in accurate determination of the placement at low cost. For example, rather than attempting to determine placement of a face by analyzing the entirety of the face, the placement of the face may be determined by using one or more of left upper cheek point/area, right upper cheek point/area, nose, ears, and/or other stable features of the face. The placement of the face may be determined by using a combination of stable elements. For example, the placement of the face within the visual content may be determined based on a width line that runs across eyes of the face. The width line may connect the left upper cheek point/area and right upper cheek point/area of the face. The width line may represent the locations of the left and right upper cheek points/areas of the face. The width line/left and right upper cheek points/areas of the face may provide indication of the rotation, position, and/or size of the face within the visual content. The width line/left and right upper cheek points/areas of the face may be resistant to changes/movement of the face. Use of other stable features are contemplated.

In some implementations, the placement of an object of interest within a particular video frame of a video may be determined further based on the placement of the object of interest within one or more prior video frames and/or one or more subsequent video frames. The placement determined within preceding and/or following video frames may be used limit the placement determination within the video frame. Other determination of the placement of the object of interest depicted within the visual content is contemplated.

The movement stabilization component 106 may be configured to, responsive to determination that the visual content does not depict the object of interest, stabilize the visual content based on movement of the image capture device during capture of the visual content and/or other information. The visual content may be stabilized to provide a smoother view of the visual content. Stabilization of visual content may include using smaller spatial extents of the visual content to provide a punchout view of the visual content that creates a more stable view than when viewing the entirety of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. A viewing window may be used to determine the extents of the visual content to be used to stabilize the visual content. A viewing window may define extents of the visual content to be included within the stabilized visual content. A viewing window may define extents of the visual content to be included within a punchout of the visual content. Inclusion of the extents of the visual content within the viewing windows in the stabilized visual content may effectuate stabilization of the visual content via selective cropping.

Stabilization of the visual content based on the movement of the image capture device during capture of the visual content (movement stabilization) may include use of a viewing window to provide a stabilized punchout of the visual content. The placement of the viewing window within the field of view of the visual content may be determined based on the movement of the image capture device during capture of the visual content and/or other information. For example, the placement of the viewing window within the field of view of the visual content may be determined based on rotational positions (changes in rotational positions) of the image capture device during the capture duration to provide a stabilized punchout of the visual content. The rotation, position, size, and/or other characteristics (e.g., shape) of the viewing window may be determined may be determined based on the rotational positions of the image capture device to provide a stabilized punchout of the visual content.

A stabilized punchout of the visual content may refer to a punchout of the visual content that provides a stabilized view of the visual content. A stabilized punchout of the visual content may refer to a punchout of the visual content in which extents of the visual content are selected for presentation such that the visual content appears stable/more stable. The stabilized view of the visual content may refer to view of the visual content in which the visual content appears stable. The stabilized view of the visual content may refer to view of the visual content in which the visual content appears more stable than the original visual content (e.g., includes less shakes and/or jitters than the original visual content). For example, the image capture device may have been shaken and/or experience vibration during capture of the visual content. The viewing window may be determined to compensate for the shaking and/or vibration of the image capture device during the capture duration such that the stabilized punchout of the visual content provides a view of the visual content that appears to have been captured by the image capture device without/with shaking and/or vibration. For instance, the placement of the viewing window may be determined to minimize a shakiness indicator for the visual content, with the value of the shakiness indicator determined based on a combination of rotational velocity and rotational acceleration. In some implementations, the stabilization of the visual content may be performed based on future movement of the image capture device. For example, the placement of the viewing window for a particular moment within the video may be determined based on movement of the image capture device at later moments within the video.

In some implementations, the viewing window may be determined based on the rotational positions of the image capture device during the capture of the visual content to provide a horizon-leveled punchout of the visual content. The rotation, position, size, and/or other characteristics of the viewing window may be determined based on the rotational positions of the image capture device to provide a horizon-leveled punchout of the visual content. A horizon-leveled punchout of the visual content may refer to a punchout of the visual content that provides a horizon-leveled view of the visual content.

A horizon leveled punchout of the visual content may refer to a punchout of the visual content in which extents of the visual content are selected for presentation such that the visual content appears leveled/more leveled with respect to the horizon. The horizon leveled view of the visual content may refer to view of the visual content in which the visual content appears leveled with respect to the horizon. The horizon leveled view of the visual content may refer to view of the visual content in which the visual content appears more leveled with respect to the horizon than the original visual content. For example, the image capture device may have been tilted to the left and/or right during the capture duration. The viewing window may be determined to compensate for the tiling of the image capture device during the capture duration such that the horizon-leveled punchout of the visual content provides a view of the visual content that appears to have been captured by the image capture device without/with less tilting. Generation of visual content that is horizon leveled may be referred to as horizon leveling.

The stabilization of the visual content based on the movement of the image capture device during capture of the visual content may not take into account depiction of things within the visual content. The visual content may be stabilized to reduce motion within the visual content without regards as to relationship between where the viewing window is placed within the visual content and where things are depicted within the visual content. If an object of interest is depicted within the visual content, the punchout used to stabilize the visual content may not include the object of interest. That is, the object of interest may be outside the viewing window used to provide the stabilized punchout of the visual content.

The object stabilization component 108 may be configured to, responsive to determination that the visual content depicts the object of interest, stabilize the visual content based on placement of the object of interest within the visual content and/or other information. Stabilization of the visual content based on the placement of the object of interest within the visual content (object stabilization) may include use of a viewing window to provide a punchout of the visual content in which the object of interest is stable/more stable. Stabilization of the visual content based on the placement of the object of interest within the visual content may include use of a viewing window to provide a punchout of the visual content in which the object of interest does not move/moves less than the original visual content. For example, the object of interest may include a face, and the visual content may be stabilized to provide a consistent view of the face within the stabilized visual content.

Stabilization of the visual content based on the placement of the object of interest within the visual content may include use of the placement of the object of interest within the visual content to determine the placement of the viewing window for stabilizing the visual content. In some implementations, the placement of the object of interest within the visual content, rather than the movement of the image capture device, may be used to determine placement of the viewing window. Rather than using how the image capture device was moved during the capture duration, the object stabilization may utilize placement of the object within the visual content to determine placement of the viewing window. The viewing window may be determined to compensate for changes in placement of the object of interest within the visual content.

In some implementations, the placement of the object of interest within the visual content may be used with the movement of the image capture device to determine placement of the viewing window. For example, placement of the object of interest within the stabilized visual content may be used as an additional constraint in performing movement stabilization. That is, object stabilization may include modification of the movement stabilization to include an additional constraint of stabilizing the object of interest within the visual content. The placement of the object of interest within the visual content may be used to guide the movement stabilization.

In some implementations, the viewing window used to perform object stabilization may be different from the viewing window used to perform movement stabilization. For example, the viewing window used to perform object stabilization may be smaller than the viewing window used to perform movement stabilization. The viewing window used to perform object stabilization may have a different shape than the viewing window used to perform movement stabilization to provide differently shaped punchout (e.g., linear punchout for object stabilization; wide punchout for movement stabilization). Such change in the viewing window may provide more stabilization margins for object stabilization than movement stabilization.

In some implementations, the visual content may be stabilized based on the placement of the object of interest to reduce translational movement (e.g., up, down, left, right) of the object of interest within the visual content. The placement of the viewing window may be determined to offset the translational movement of the object of interest within the visual content. The visual content may be stabilized be maintain the translational position of the object of interest within the stabilized visual content.

In some implementations, the visual content may be stabilized based on the placement of the object of interest to reduce rotational movement (e.g., rotating to the left or right) of the object of interest within the visual content. The placement of the viewing window may be determined to offset the rotational movement of the object of interest within the visual content. The visual content may be stabilized be maintain the rotational position of the object of interest within the stabilized visual content.

In some implementations, the position of the viewing window may be determined based on the position of the object of interest within the visual content and/or other information. The visual content may be stabilized based on the placement of the object of interest to keep the object of interest within a target portion of the stabilized visual content. The target portion may refer to a portion in which the object of interest is to be positioned. The target portion may include a center portion of the stabilized visual content and/or other portion of the stabilized visual content. For example, responsive to detection of a face within the visual content, the visual content may be stabilized based on the placement of the face so that the face is positioned at the center of the stabilized visual content.

FIG. 3A illustrates an example viewing window 320 to perform object stabilization. The image 300 may include the depiction of the face 302. The placement of the viewing window 320 may be determined based on the placement of the face 302 within the image 300. The placement of the viewing window 320 may be determined to position the face 302 within/at the center portion of the viewing window 320. Such determination of the viewing window 320 for different video frames of a video may result in a stabilized video with the face 302 positioned in the center. Other position of the object of interest within the stabilized visual content is contemplated.

In some implementations, the size of the viewing window may be determined based on the size of the object of interest within the visual content and/or other information. The visual content may be stabilized based on the placement of the object of interest to keep the size of the object of interest consistent, such as at a target size. The target size may refer to the size at which the object of interest should be included in the stabilized visual content. The visual content may be stabilized based on the placement of the object of interest to reduce the extent to which the object of interest changes its size within the stabilized visual content. For example, stabilization of a video that includes a face may reduce/eliminate changes in the size of the face within the stabilized video.

To keep the size of the object of interest consistent within the stabilized visual content, the size of the viewing window may change with change in size of the object of interest. The size of the viewing window may be determined to offset the change in size the object of interest depicted within the visual content. For instance, a digital zoom may be used to keep a face the same size in the video. When the size of the face increases in a video, the size of the viewing window may be increased (e.g., digital zoom out). When the size of the face decreases in a video, the size of the viewing window may be decreased (e.g., digital zoom in).

In some implementations, rotation of the viewing window may be determined based on the rotation of the object of interest within the visual content and/or other information. The visual content may be stabilized based on the placement of the object of interest to keep the orientation of the object of interest consistent, such as at target orientation. The target orientation may refer to the orientation in which the object of interest should be positioned in the stabilized visual content. The visual content may be stabilized based on the placement of the object of interest to reduce the extent to which the object of interest changes its orientation within the stabilized visual content. For example, stabilization of a video that includes a face may reduce/eliminate rotation of the face within the stabilized video (e.g., keep the face upright in the stabilized video).

Figure 3B:
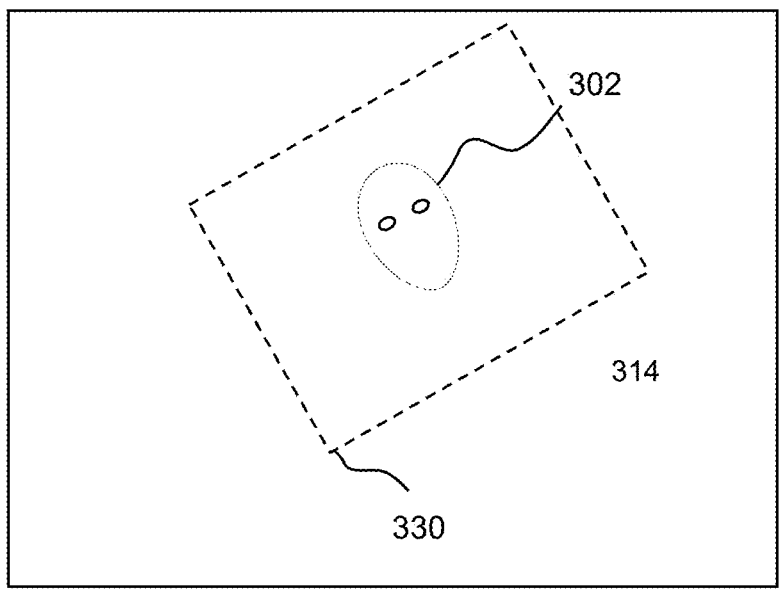
FIG. 3B illustrates an example viewing window to perform object stabilization.

To keep the orientation of the object of interest consistent within the stabilized visual content, the rotation of the viewing window may change with rotation of the object of interest. The rotation of the viewing window may be determined to offset the rotation of the object of interest depicted within the visual content. For example, FIG. 3B illustrates an example viewing window 330 to perform object stabilization. The image 300 may include the depiction of the face 302. The placement of the viewing window 330 may be determined based on the placement of the face 302 within the image 300. The placement of the viewing window 330 may be determined to position the face 302 within/at the center portion of the viewing window 330. The placement of the viewing window 330 may be determined to rotate the viewing window 330 at the same angle as the face 302. Such determination of the viewing window 330 for different video frames of a video may result in a stabilized video with the face 302 upright and positioned in the center. Other orientation of the object of interest within the stabilized visual content is contemplated.

Figure 4:
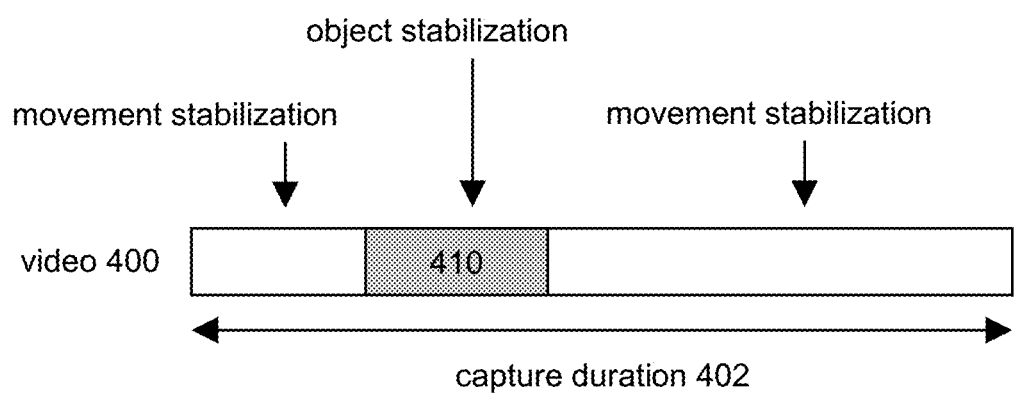
FIG. 4 illustrates example switching between movement stabilization and object stabilization.

FIG. 4 illustrates example switching between movement stabilization and object stabilization. Movement stabilization may include stabilization of visual content based on movement of an image capture device during capture of the visual content and/or other information. Object stabilization may include stabilization of visual content based on placement of an object of interest within the visual content and/or other information. In FIG. 4, a video 400 may be captured by an image capture device over a capture duration. The video 400 may include a part 410 in which the video includes depiction of an object of interest. Other parts of the video 400 may not include depiction of the object of interest.

The stabilization of the video 400 may be switched between movement stabilization and object stabilization based on whether or not the video 400 depicts an object of interest. When the video 400 depicts the object of interest, the stabilization may be switched to object stabilization. When the video 400 does not depict the object of interest, the stabilization may be switched to movement stabilization. In FIG. 4, responsive to the part 410 of the video 400 depicting the object of interest, the part 410 of the video 400 may be stabilized using object stabilization. Response to other parts of the video 400 not depicting the object of interest, the other parts of the video 400 may be stabilized using movement stabilization.

In some implementations, the determination of the rotation of the viewing window based on the rotation of the object of interest within the visual content may be performed responsive to stabilization of the visual content based on the movement of the image capture device during capture of the visual content including horizon leveling. Object stabilization may keep the orientation of the object of interest consistent within the stabilized visual content based on horizon leveling being used/turned on in the movement stabilization. For example, object stabilization may include object leveling to keep the object upright in the stabilized visual content. When horizon leveling is being used/turned on in the movement stabilization, object leveling may be used/turned on in the object stabilization. When horizon leveling is not being used/turned off in the movement stabilization, object leveling may not be used/turned off in the object stabilization.

Whether or not object leveling is used/turned on in object stabilization may depend on whether or not horizon leveling is used/turned on in movement stabilization. For example, when horizon leveling is turned on in movement stabilization, face leveling may be turned on in object stabilization (e.g., replace horizon leveling with face leveling when switching from movement stabilization to object stabilization). When horizon leveling is turned off in movement stabilization, face leveling may be turned off in object stabilization.

In some implementations, the determination of the rotation of the viewing window based on the rotation of the object of interest within the visual content may be performed by replacing use of gravity vector of the image capture device in the horizon leveling with use of the rotation of the object of interest within the visual content. The gravity vector of the image capture device may provide information on the direction of gravity on the image capture device during capture of the visual content. The gravity vector of the image capture device may provide information on how the image capture device was rotated with respect to ground during capture of the visual content.

Figure 5:
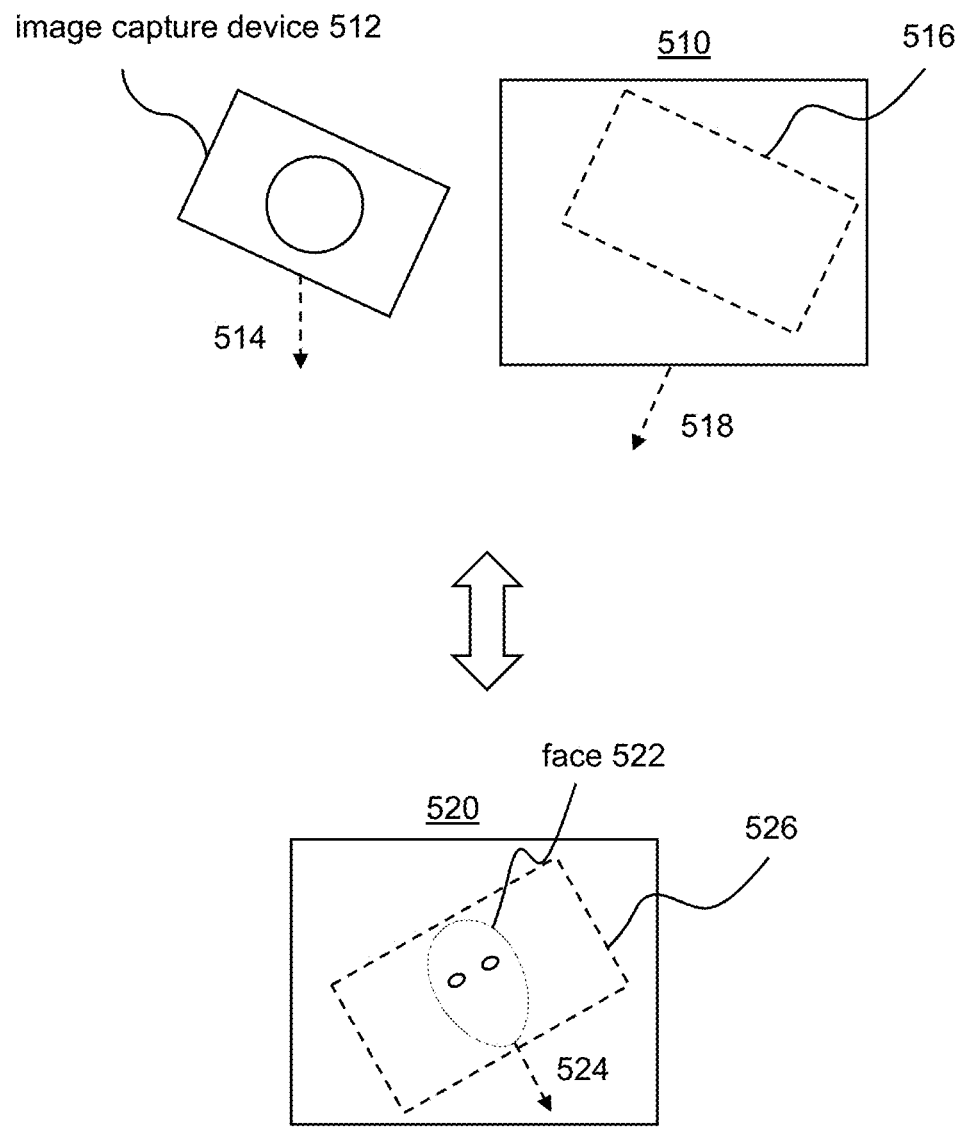
FIG. 5 illustrates example switching between movement stabilization and object stabilization.

Horizon leveling in movement stabilization may be performed by rotating the viewing window so that viewing window is aligned with the gravity vector of the image capture device. That is, the viewing window may be rotated so that the gravity vector is pointing down in the punchout. For example, in FIG. 5, an image capture device 512 may be tilted while capturing an image 510. A gravity vector 514 on the image capture device 512 may be angled from a vertical axis of the image capture device 512. The gravity vector 514 may be reflected as a gravity vector 518 in the image 510. The gravity vector 518 may indicate the downward direction in the image 510. To perform horizon leveling, a viewing window 516 may be rotated as shown in FIG. 5 so that the gravity vector 518 is pointed down in the punchout of the image 510.

The image capture device 512 may capture an image 520. The image 520 may include depiction of a face 522. Based on the image 520 depicting the face 522, the stabilization may switch from movement stabilization to object stabilization. Based on horizon leveling being used in the movement stabilization, face leveling may be used in object stabilization. To perform face leveling, rotation of the face 522 may be determined and used in place of the gravity vector. For example, face leveling may take advantage of the horizon leveling technique in movement stabilization by using downward direction of the face, rather than the actual gravity vector of the image capture device, to perform the leveling. Horizon leveling technique may be tricked into performing face leveling by using the rotation of the face in place of the actual gravity vector. For example, in FIG. 5, rather than aligning the viewing window 516 to be aligned with the gravity vector 518, a viewing window 526 may be aligned with a downward direction 524 of the face 522. The downward direction 524 of the face 522 may indicate the amount by which the face 522 is angled (e.g., roll angle) in the image 520.

In some implementations, stabilization of the visual content based on the placement of the face within the visual content may change based on facial expression and/or other information. That is, when the object of interest includes a face, facial expression may be used to change stabilization that is used to stabilize the visual content. For example, specific facial expression may be associated with specific type/parameter of stabilization, and the particular type/parameter of stabilization may be used based on the specific facial expression being detected within the visual content. For example, the size of the viewing window, the leveling of the object of interest, and/or use of the object stabilization may be changed via specific facial expression (e.g., winking, smiling). For instance, when a winking is detected, the size of the viewing window may be changed (e.g., increased, decreased), object of interest leveling may be turned on/off, or the stabilization may be switched between object stabilization and movement stabilization. Use of other facial expressions and other changes in stabilization of the visual content are contemplated.

In some implementations, stabilization of the visual content may be performed during capture of the visual content by the image capture device. The visual content captured by the image capture device may be stored in a buffer while stabilization is being performed. In some implementations, stabilization of the visual content may be performed after capture of the visual content by the image capture device. The visual content may be obtained after capture to perform post-capture stabilization of the visual content. Post-capture stabilization of the visual content may be performed by the image capture device and/or another computing device (e.g., mobile device paired with the image capture device, desktop device to which the visual content is transferred, server device to which the visual content is uploaded). The type of stabilization (e.g., movement stabilization, object stabilization) may change based on whether or not the object of interest is depicted within the visual content.

In some implementation, the stabilized visual content may be generated as an encoded visual content (e.g., an encoded video file). For example, the stabilized visual content may be generated as an encoded video clip, and the video clip may be opened in a video player for presentation. In some implementations, the stabilized visual content may be generated as instruction identifying/defining the viewing window to be used in providing a stabilized view of the visual content. A video play use the instructions to retrieve the extents of the video within the viewing window for presentation.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
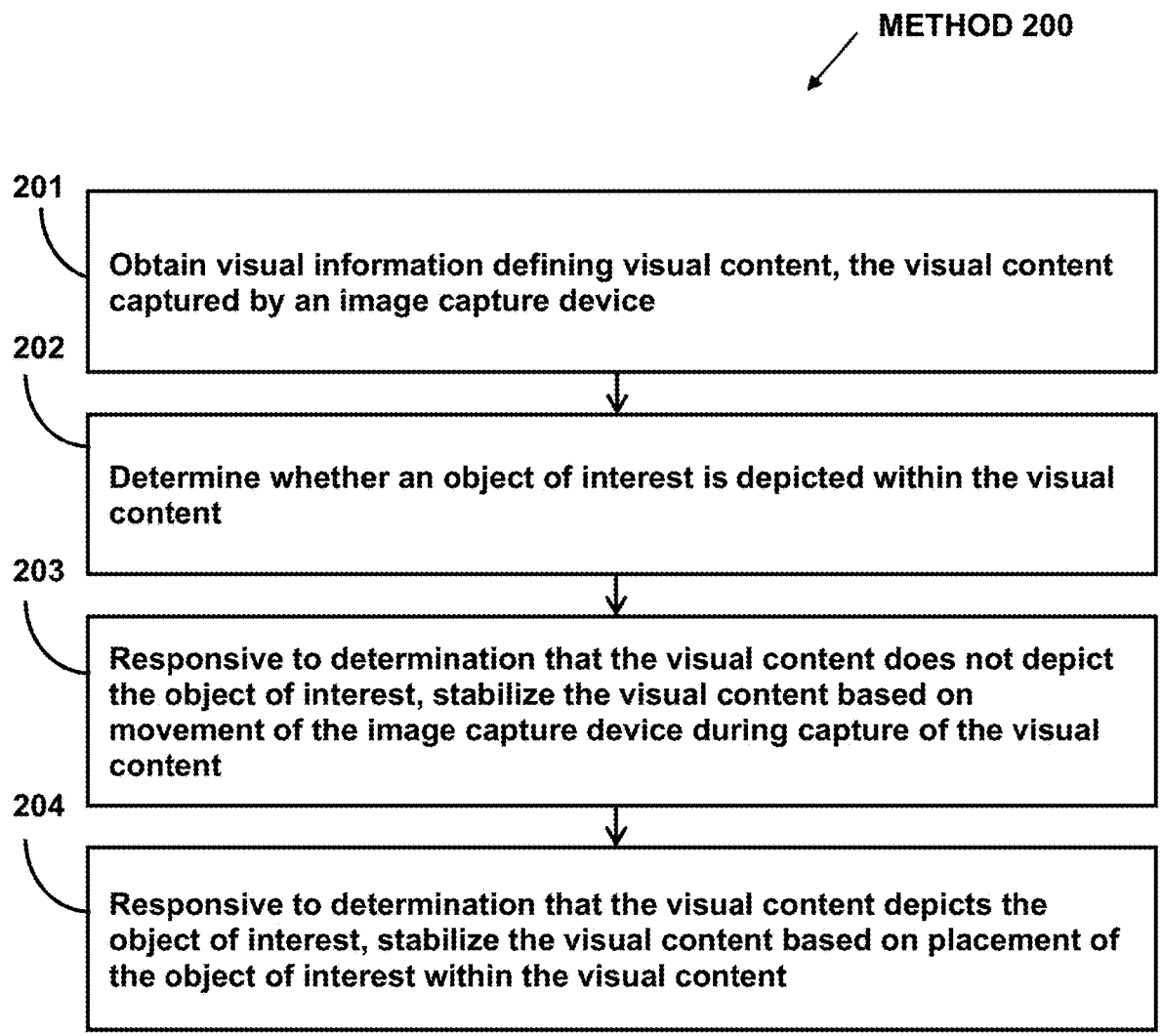
FIG. 2 illustrates a method for stabilizing videos.

FIG. 2 illustrates method 200 for stabilizing videos. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, visual information may be obtained. The visual information may define visual content. The visual content may be captured by an image capture device. In some implementations, operation 201 may be performed by a processor component the same as or similar to the visual information component 102 (Shown in FIG. 1 and described herein).

At operation 202, whether an object of interest is depicted within the visual content may be determined. In some implementations, operation 202 may be performed by a processor component the same as or similar to the object of interest component 104 (Shown in FIG. 1 and described herein).

At operation 203, responsive to determination that the visual content does not depict the object of interest, the visual content may be stabilized based on movement of the image capture device during capture of the visual content and/or information. In some implementations, operation 203 may be performed by a processor component the same as or similar to the movement stabilization component 106 (Shown in FIG. 1 and described herein).

At operation 204, responsive to determination that the visual content depicts the object of interest, the visual content may be stabilized based on placement of the object of interest within the visual content and/or other information. In some implementations, operation 204 may be performed by a processor component the same as or similar to the object stabilization component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for stabilizing videos, the system comprising:
one or more physical processors configured by machine-readable instructions to:
obtain visual information defining visual content of a video, the visual content of the video captured by an image capture device; and
switch between movement stabilization and object stabilization to stabilize the visual content of the video, wherein the movement stabilization is used to stabilize the visual content in a first part of the video in which the visual content does not depict an object of interest and the object stabilization is used to stabilize the visual content in a second part of the video in which the visual content depicts the object of interest, wherein switching between the movement stabilization and the object stabilization to stabilize the visual content of the video includes:
determination of whether the object of interest is depicted within the visual content in a given part of the video;
responsive to determination that the visual content in the given part of the video does not depict the object of interest, stabilization of the visual content in the given part of the video based on the movement stabilization, the movement stabilization including stabilization of the visual content based on movement of the image capture device during capture of the given part of the video, the movement stabilization of the visual content including use of a first viewing window to provide a first punchout of the visual content to stabilized the visual content, wherein the movement stabilization does not take into account depiction of things within the visual content and stabilizes the visual content without regards as to relationship between where the first viewing window is placed within the visual content and where things are depicted within the visual content in the given part of the video; and responsive to determination that the visual content in the given part of the video depicts the object of interest, stabilization of the visual content in the given part of the video based on the object stabilization, the object stabilization including use of placement of the object of interest within the visual content to determine placement of a second viewing window to provide a second punchout of the visual content that keeps the object of interest within a center portion of the stabilized visual content, wherein the object stabilization does not take into account movement of the image capture device during capture of the given part of the video, the second viewing window smaller than the first viewing window.

2. The system of claim 1, wherein:
the object stabilization includes object leveling to keep the object of interest upright in the stabilized visual content, the object leveling including determination of rotation of the viewing window for stabilization based on rotation of the object of interest within the visual content;
the object leveling is performed during the object stabilization responsive to the movement stabilization including horizon leveling;
the object leveling is not performed during the object stabilization responsive to the movement stabilization not including horizon leveling;
the horizon leveling in the movement stabilization is performed using a gravity vector of the image capture device; and
the object leveling in the object stabilization is performed by replacing use of the gravity vector of the image capture device in the horizon leveling with use of the rotation of the object of interest within the visual content.

3. A system for stabilizing videos, the system comprising:
one or more physical processors configured by machine-readable instructions to:
obtain visual information defining visual content of a video, the visual content of the video captured by an image capture device; and
switch between movement stabilization and object stabilization to stabilize the visual content of the video, wherein the movement stabilization is used to stabilize the visual content in a first part of the video in which the visual content does not depict an object of interest and the object stabilization is used to stabilize the visual content in a second part of the video in which the visual content depicts the object of interest, wherein switch between the movement stabilization and the object stabilization to stabilize the visual content of the video includes:
determination of whether the object of interest is depicted within the visual content in a given part of the video;
responsive to determination that the visual content in the given part of the video does not depict the object of interest, stabilization of the visual content in the given part of the video based on the movement stabilization, the movement stabilization including stabilization of the visual content based on movement of the image capture device during capture of the visual content; given part of the video, wherein the movement stabilization does not take into account depiction of things within the visual content and stabilizes the visual content without regards as to relationship between where a viewing window for stabilization is placed within the visual content and where things are depicted within the visual content in the given part of the video; and
responsive to determination that the visual content in the given part of the video depicts the object of interest, stabilization of the visual content in the given part of the video based on the object stabilization, the object stabilization including use of placement of the object of interest within the visual content to determine where the viewing window for stabilization is placed within the visual content, wherein the object stabilization does not take into account movement of the image capture device during capture of the given part of the video.

4. The system of claim 3, wherein the object of interest includes a face.

5. The system of claim 4, wherein the object stabilization of the visual content changes based on facial expression.

6. The system of claim 3, wherein the object stabilization places the viewing window for stabilization within the visual content based on the placement of the object of interest to keep the object of interest within a center portion of the stabilized visual content.

7. The system of claim 3, wherein stabilization of the visual content is performed during capture of the visual content by the image capture device.

8. The system of claim 3, wherein:
the movement stabilization includes use of a first viewing window to provide a first punchout of the visual content to stabilize the visual content;
the object stabilization includes use of a second viewing window to provide a second punchout of the visual content to stabilize the visual content; and
the second viewing window is smaller than the first viewing window.

9. The system of claim 3, wherein the object stabilization includes object leveling to keep the object of interest upright in the stabilized visual content, the object leveling including determination of rotation of the viewing window for stabilization based on rotation of the object of interest within the visual content.

10. The system of claim 9, wherein:
the object leveling is performed during the object stabilization responsive to the movement stabilization including horizon leveling; and
the object leveling is not performed during the object stabilization responsive to the movement stabilization not including horizon leveling.

11. The system of claim 10, wherein:
the horizon leveling in the movement stabilization is performed using a gravity vector of the image capture device; and
the object leveling in the object stabilization is performed by replacing use of the gravity vector of the image capture device in the horizon leveling with use of the rotation of the object of interest within the visual content.

12. A method for stabilizing videos, the method performed by a computing system including one or more processors, the method comprising:
obtaining, by the computing system, visual information defining visual content of a video, the visual content of the video captured by an image capture device; and switching, by the computing system, between movement stabilization and object stabilization to stabilize the visual content of the video, wherein the movement stabilization is used to stabilize the visual content in a first part of the video in which the visual content does not depict an object of interest and the object stabilization is used to stabilize the visual content in a second part of the video in which the visual content depicts the object of interest, wherein switching between the movement stabilization and the object stabilization to stabilize the visual content of the video includes:

determining, by the computing system, whether the object of interest is depicted within the visual content in a given part of the video;

responsive to determining that the visual content in the given part of the video does not depict the object of interest, stabilizing, by the computing system, the visual content in the given part of the video based on the movement stabilization, the movement stabilization including stabilization of the visual content based on movement of the image capture device during capture of the given part of the video, wherein the movement stabilization does not take into account depiction of things within the visual content and stabilizes the visual content without regards as to relationship between where a viewing window for stabilization is placed within the visual content and where things are depicted within the visual content in the given part of the video; and responsive to determining that the visual content in the given part of the video depicts the object of interest, stabilizing, by the computing system, the visual content in the given part of the video based on the object stabilization, the object stabilization including use of placement of the object of interest within the visual content to determine where the viewing window for stabilization is placed within the visual content, wherein the object stabilization does not take into account movement of the image capture device during capture of the given part of the video.

13. The method of claim 12, wherein the object of interest includes a face.

14. The method of claim 13, wherein the object stabilization of the visual content changes based on facial expression.

15. The method of claim 12, wherein the object stabilization places the viewing window for stabilization within the visual content based on the placement of the object of interest to keep the object of interest within a center portion of the stabilized visual content.

16. The method of claim 12, wherein stabilization of the visual content is performed during capture of the visual content by the image capture device.

17. The method of claim 12, wherein:
the movement stabilization includes use of a first viewing window to provide a first punchout of the visual content to stabilize the visual content;
the object stabilization includes use of a second viewing window to provide a second punchout of the visual content to stabilize the visual content; and
the second viewing window is smaller than the first viewing window.

18. The method of claim 12, wherein the object stabilization includes object leveling to keep the object of interest upright in the stabilized visual content, the object leveling including determination of rotation of the viewing window for stabilization based on rotation of the object of interest within the visual content.

19. The method of claim 18, wherein:
the object leveling is performed during the object stabilization responsive to the movement stabilization including horizon leveling; and
the object leveling is not performed during the object stabilization responsive to the movement stabilization not including horizon leveling.

20. The method of claim 19, wherein:
the horizon leveling in the movement stabilization is performed using a gravity vector of the image capture device; and
the object leveling in the object stabilization is performed by replacing use of the gravity vector of the image capture device in the horizon leveling with use of the rotation of the object of interest within the visual content.

* * * * *